United States Patent [19]
Mochikawa

[11] Patent Number: 5,808,882
[45] Date of Patent: Sep. 15, 1998

[54] THREE-PHASE BRIDGE RECTIFIER

[75] Inventor: Hiroshi Mochikawa, Yokkaichi, Japan

[73] Assignee: Kabushiki Kaisha Toshiba, Kanagawa-ken, Japan

[21] Appl. No.: 774,086

[22] Filed: Dec. 23, 1996

[30] Foreign Application Priority Data

Dec. 28, 1995 [JP] Japan ..................................... 7-342965

[51] Int. Cl.⁶ ................................................. H02M 1/12
[52] U.S. Cl. ................................ 363/46; 363/37; 363/70; 363/126; 363/127
[58] Field of Search ............................. 363/53, 37, 700, 363/69, 46, 126, 127, 44, 45

[56] References Cited

U.S. PATENT DOCUMENTS 3,927,362  12/1975  Brewster ...................................... 363/3
5,633,790   5/1997  Gritter et al. .............................. 363/55

OTHER PUBLICATIONS

IEE Japan Transaction vol. 112–D, No. 5, May 1992, p. 497; K. Oguchi et al.; May 20, 1992.

*Primary Examiner*—Peter S. Wong
*Assistant Examiner*—Shawn Riley

*Attorney, Agent, or Firm*—Limbach & Limbach, LLP

[57] ABSTRACT

A three-phase bridge rectifier includes three bidirectional switching circuits each including a single-phase rectifier circuit having four single-phase bridge-connected diodes and a semiconductor switching element connected between DC output terminals of the single-phase rectifier circuit, three AC side reactors each connected between one of two AC input terminals of each bidirectional switching circuit and each one of output terminals of a three-phase AC power supply, three positive side diodes each having an anode connected to a positive side DC output terminal of each one of the bidirectional switching circuits and a cathode connected to a positive side DC bus, three negative side diodes each having a cathode connected to a negative side DC output terminal of each one of the bidirectional switching circuits and an anode connected to a negative side DC bus, a smoothing capacitor including two capacitors series connected between the positive and negative side DC buses and a neutral terminal connected to the other AC input terminal of each bidirectional switching circuit, and a control circuit for controlling the semiconductor switching elements of the respective bidirectional switching circuits.

17 Claims, 8 Drawing Sheets

THREE-PHASE BRIDGE RECTIFIER

BACKGROUND OF THE INVENTION

1. Field of the Invention

This invention relates to a three-phase bridge rectifier for rectifying a three-phase alternating current to convert it to a corresponding direct current.

2. Description of the Prior Art

Three-phase bridge rectifiers have been provided for rectifying a three-phase alternating current to convert it to a corresponding direct current. The rectifiers generally comprise a three-phase rectifier circuit including six three-phase bridge-connected diodes and a smoothing capacitor connected between DC output terminals of the rectifier circuit. The six bridge-connected diodes include three positive side diodes and three negative side diodes. The rectifier circuit needs to rectify three-phase AC voltages separated from each other in phase by 120 electrical degrees. For this purpose, only those of the six diodes belonging to the phases indicative of peak values of the three-phase AC voltages at the respective positive and negative sides are turned on such that the rectifier circuit is energized between these two phases. This manner of energization, however, results in distorted current waveforms at the input side of the rectifier circuit, whereupon the input side current disadvantageously contains harmonic components.

To suppress the above-mentioned harmonic components, the prior art has provided a DC reactor or step-up chopper in the rectifier circuit so that harmonic waves contained in the input current are reduced. However, an insufficient effect of waveform improvement is achieved from the DC reactor or step-up chopper and therefore, the harmonic current cannot sufficiently be suppressed.

The prior art has also provided a three-phase PWM converter to be used to approximate the input current to a sinusoidal wave. The three-phase PWM converter, however, requires six switching elements each of which needs to be designed so as to have a maximum allowed current equal to a peak value of a phase current and a withstand voltage sufficiently larger than a maximum value of the DC bus voltage. As a result, loss in the switching operation of each switching element is increased, and the switching operation is accompanied with a large amount of high frequency noise. Furthermore, since a large three-phase AC reactor is required to render a current ripple small, the size and the cost of the three-phase bridge rectifier are increased.

SUMMARY OF THE INVENTION

Therefore, an object of the present invention is to provide a three-phase bridge rectifier in which the distortion in the waveforms of currents flowing at the time of rectification can be reduced and which is small in size and low in cost.

Another object of the invention is to provide a three-phase bridge rectifier in which forward and backward recovery losses in positive and negative side diodes can be reduced when each bidirectional switching circuit performs a high-speed switching operation.

Further another object of the invention is to provide a three-phase bridge rectifier in which an electrical loss and noise due to switching can be reduced in each of semiconductor switching elements.

Further another object of the invention is to provide a three-phase bridge rectifier in which a current waveform can be rendered approximately sinusoidal.

Further another object of the invention is to provide a three-phase bridge rectifier in which a power supply efficiency can be improved.

In one form of the present invention, a three-phase bridge rectifier comprises three bidirectional switching circuits each including a single-phase rectifier circuit having four single-phase bridge-connected diodes and a semiconductor switching element connected between DC output terminals of the single-phase rectifier circuit. Three AC side reactors are each connected between one of two AC input terminals of each bidirectional switching circuit and each one of output terminals of a three-phase AC power supply. Three positive side diodes are provided each having an anode connected to a positive side DC output terminal of each one of the bidirectional switching circuits and a cathode connected to a positive side DC bus. Three negative side diodes are provided each having a cathode connected to a negative side DC output terminal of each one of the bidirectional switching circuits and an anode connected to a negative side DC bus. A smoothing capacitor is provided which includes two capacitors series connected between the positive and negative side DC buses and a neutral terminal connected to the other AC input terminal of each bidirectional switching circuit. A control circuit is provided for controlling the semiconductor switching elements of the respective bidirectional switching circuits.

In another form of the present invention, in addition to the above-described bidirectional switching circuits and AC side reactors, the three-phase bridge rectifier further comprises three positive side diodes each comprising a high-speed diode and having an anode connected to said one AC input terminal of each one of the bidirectional switching circuits and a cathode connected to a positive side DC bus, and three negative side diodes each comprising a high-speed diode and having a cathode connected to said one AC input terminal of each one of the bidirectional switching circuits and an anode connected to a negative side DC bus. A smoothing capacitor is provided which includes two capacitors series connected between the positive and negative side DC buses and a neutral terminal connected to the other AC input terminal of each bidirectional switching circuit. A control circuit is provided for controlling the semiconductor switching elements of the respective bidirectional switching circuits so that the semiconductor switching elements are switched at a high speed.

In each of the above-described arrangements, a DC power supply is generated from the three-phase AC power supply by rectifying actions of the positive and negative side diodes and energy storing and discharging actions of the AC reactors on the basis of switching actions of the semiconductor switching elements of the bidirectional switching circuits.

The control circuit preferably controls a switching action of each switching element in a period of or above about 30 degrees and below 60 degrees before the zero crossover and a period of or above about 30 degrees and below 60 degrees after the zero crossover with respect to each of the phase voltages of the three-phase AC power supply, both periods being continuous.

The three-phase bridge rectifier may further comprise current detecting means for detecting phase currents of at least optional two phases of the three-phase AC power supply. In this arrangement, the control circuit controls the switching action of each semiconductor switching element so that each phase current detected by the current detecting means follows up a current command value.

The control circuit may be adapted to set a or the zero crossover of either one of each phase voltage or each interphase voltage for a reference phase of the current command value. Consequently, the current and voltage can be in phase with each other.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

Figure 1:
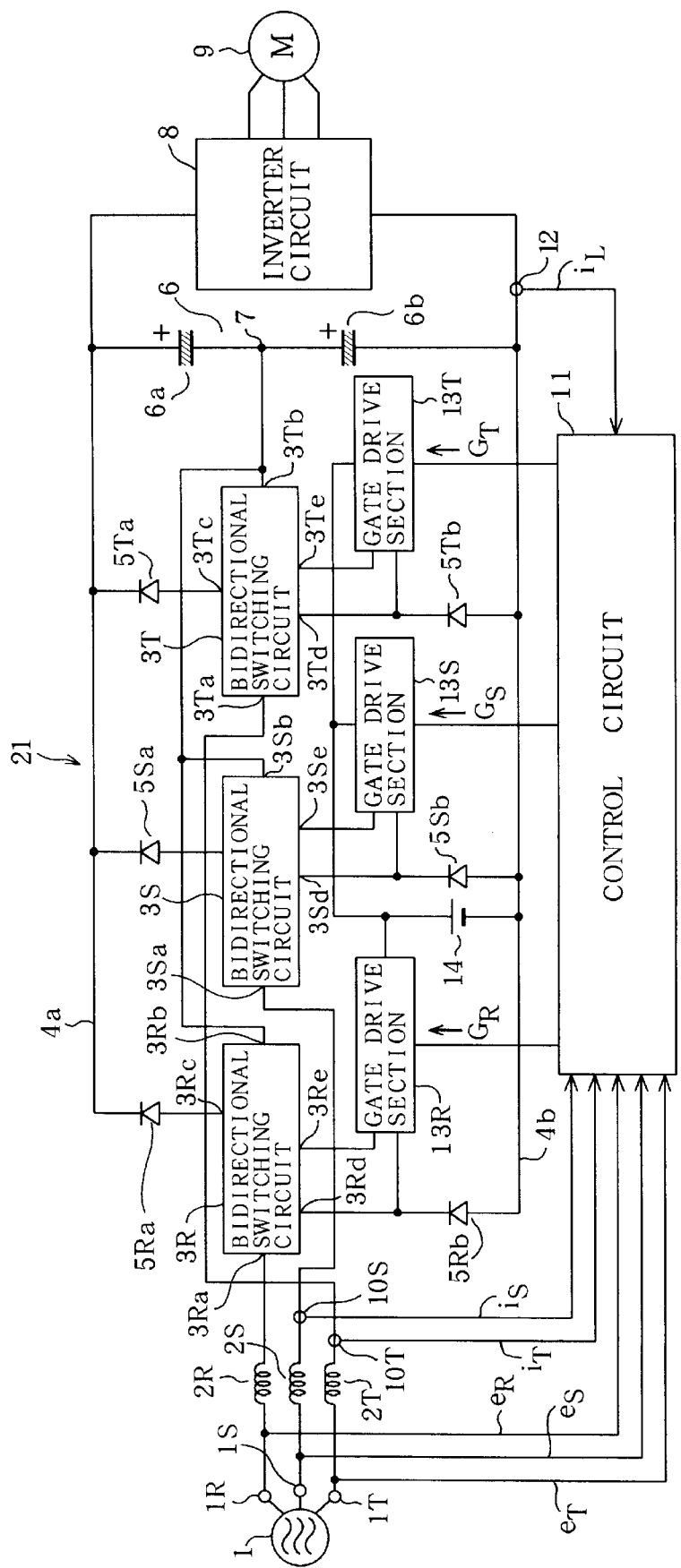
FIG. 1 is an electrical circuit diagram of the three-phase bridge rectifier of a first embodiment in accordance with the present invention.

A first embodiment of the present invention will be described with reference to FIGS. 1 to 4. Referring to FIG. 1, an electrical arrangement of the three-phase bridge rectifier of the first embodiment is shown. Output terminals 1R, 1S and 1T of a three-phase AC power supply 1 are connected through reactors (AC side reactors) 2R, 2S and 2T to AC input terminals 3Ra, 3Sa and 3Ta of bidirectional switching circuits 3R, 3S and 3T respectively.

A positive side DC bus 4a is connected in common to cathodes of positive side diodes 5Ra, 5Sa and 5Ta, whereas a negative side DC bus 4b is connected in common to anodes of negative side diodes 5Rb, 5Sb and 5Tb. Each of the positive and negative side diodes 5Ra, 5Sa, 5Ta, 5Rb, 5Sb and 5Tb is a high-speed diode. DC output terminals 3Rc and 3Rd of the bidirectional switching circuit 3R are connected to an anode of the positive side diode 5Ra and a cathode of the negative side diode 5Rb respectively. The same arrangement as described above is applied to each of the switching circuits 3S and 3T and accordingly, reference symbols "S" and "T" are used for the switching circuits instead of reference symbol "R" in FIG. 1.

A smoothing capacitor 6 comprising a series circuit of two capacitors 6a and 6b is connected between the DC buses 4a and 4b. The other AC input terminals 3Rb, 3Sb and 3Tb of the switching circuits 3R, 3S and 3T are connected in common to a neutral point terminal 7 or a common node of the capacitors 6a and 6b. An input terminal of a conventional inverter circuit 8 serving as a load is also connected between the DC buses 4a and 4b. An output terminal of the inverter circuit 8 is connected to stator coils (not shown) of respective phases of an electric motor 9 comprising an induction motor, for example.

Current detectors (current detecting means) 10S and 10T are interposed between the reactors 2S and 2T and the AC input terminals 3Sa and 3Ta of the switching circuits 3S and 3T respectively. Output terminals of the current detectors 10S and 10T are connected to respective input terminals of a control circuit 11 which is composed of a microcomputer and the like. The current detectors 10S and 10T are adapted to detect phase currents $i_S$ and $i_T$ of phases S and T of the three-phase AC power supply 1, thereby supplying them to the control circuit 11, respectively. Other input terminals of the control circuit 11 are connected to the output terminals 1R, 1S and 1T respectively so that the control circuit 11 detects phase voltages $e_R$, $e_S$ and $e_T$ of the three-phase AC power supply 1. The negative DC bus 4b is provided with a load current detector 12 (load current detecting means) having an output terminal connected to the other input terminal of the control circuit 11. The load current detector 12 is adapted to detect a load current $i_L$ flowing into the inverter circuit 8, thereby supplying the detected current to the control circuit 11.

Output terminals of the control circuit 11 are connected through gate drive sections 13R, 13S and 13T to gate signal input terminals 3Re, 3Se and 3Te of the switching circuits 3R, 3S and 3T, whereby the control circuit 11 supplies gate signals $G_R$, $G_S$ and $G_T$ to the switching circuits 3R, 3S and 3T, respectively. The gate drive sections 13R, 13S and 13T are connected to positive side terminals of a gate drive power supply 14 whose negative side terminal is connected to the negative side DC bus 4b, whereby the gate drive sections 13R, 13S and 13T are supplied with power from the gate drive power supply 14 for gate drive.

Figure 2:
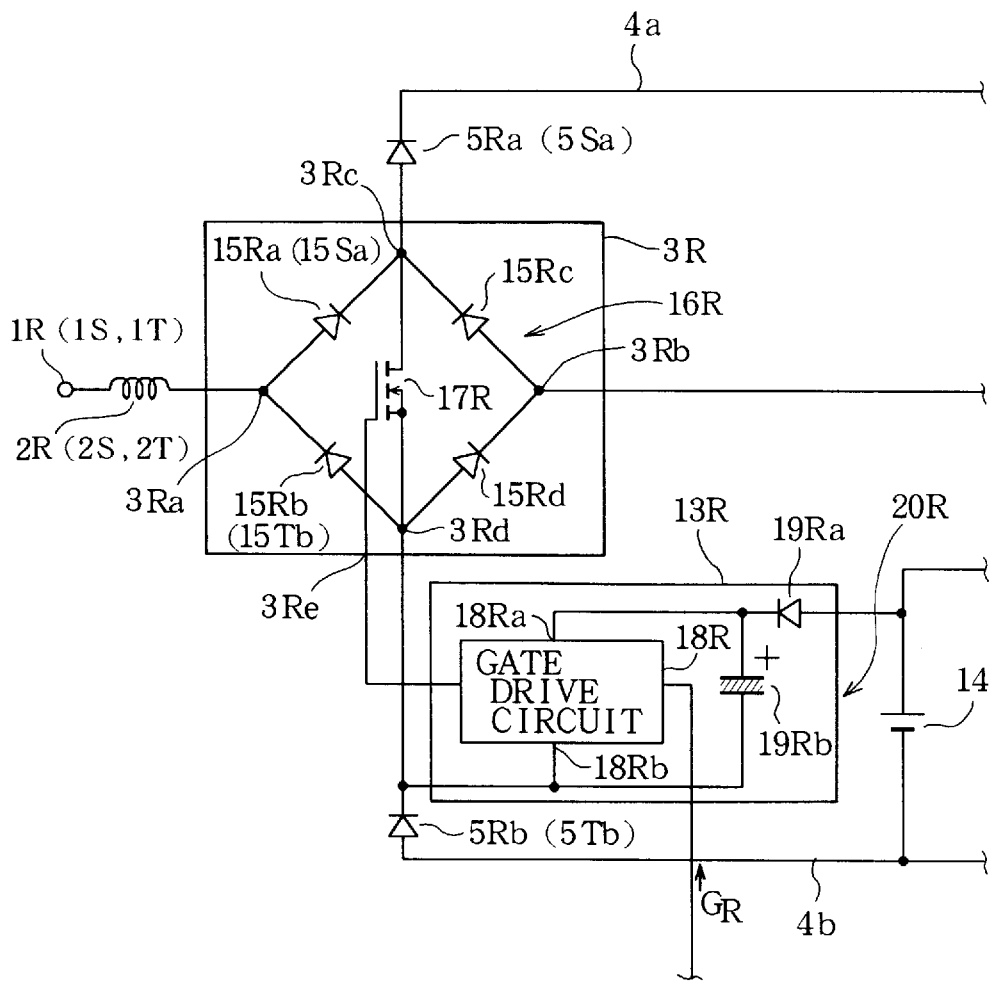
FIG. 2 is a detailed electrical circuit diagram of a switching circuit of the three-phase bridge rectifier.

Referring now to FIG. 2, an electrical arrangement of the switching circuit 3R and the gate drive section 13R is shown in detail. The switching circuit 3R includes a single-phase bridge rectifier circuit 16R composed of four single-phase bridge connected diodes 15Ra, 15Rb, 15Rc and 15Rd. A drain and a source of FET (a semiconductor switching element) 17R are connected to DC output terminals 3Rc and 3Rd of the switching circuit 3R respectively. A gate of FET 17R is connected through the gate signal input terminal 3Re to an output terminal of a gate drive circuit 18R of the gate drive section 13R, whereby the gate signal $G_R$ from the control circuit 11 is supplied through the gate drive circuit 18R to the gate of FET 17R. A negative side power input terminal 18Rb of the gate drive circuit 18R is connected to the DC output terminal 3Rd of the single-phase bridge rectifier circuit 16R, whereas a positive side power input terminal 18Ra thereof is connected through a diode 19Ra to a positive side terminal of the gate drive power supply 14. A capacitor 19Rb is connected between the positive and negative side power input terminals 18Ra and 18Rb.

A charge pump circuit 20R comprises the gate drive power supply 14, the diode 19Ra and the capacitor 19Rb. The gate drive section 13R comprises components of the gate drive circuit 18R and the charge pump circuit 20R except the gate drive power supply 14. The capacitor 19Rb of the charge pump circuit 20R is charged through the diode 10Ra from the gate drive power supply 14 during an on period of the negative side diode 5Rb. A charged current is circulated through the negative side diode 5Rb.

The foregoing describes the switching circuit 3R and the gate drive section 13R in respect of phase R. The same arrangements as described above are applied to each of the switching circuits 3S and 3T and each of the gate drive sections 13S and 13T in respect of phases S and T, and accordingly, reference symbols "S" and "T" will hereinafter be used for these components instead of reference symbol "R." The above-described arrangement except the three-phase AC power supply 1, the inverter circuit 8 and the motor 9 constitutes a three-phase bridge rectifier 21.

Figure 3:
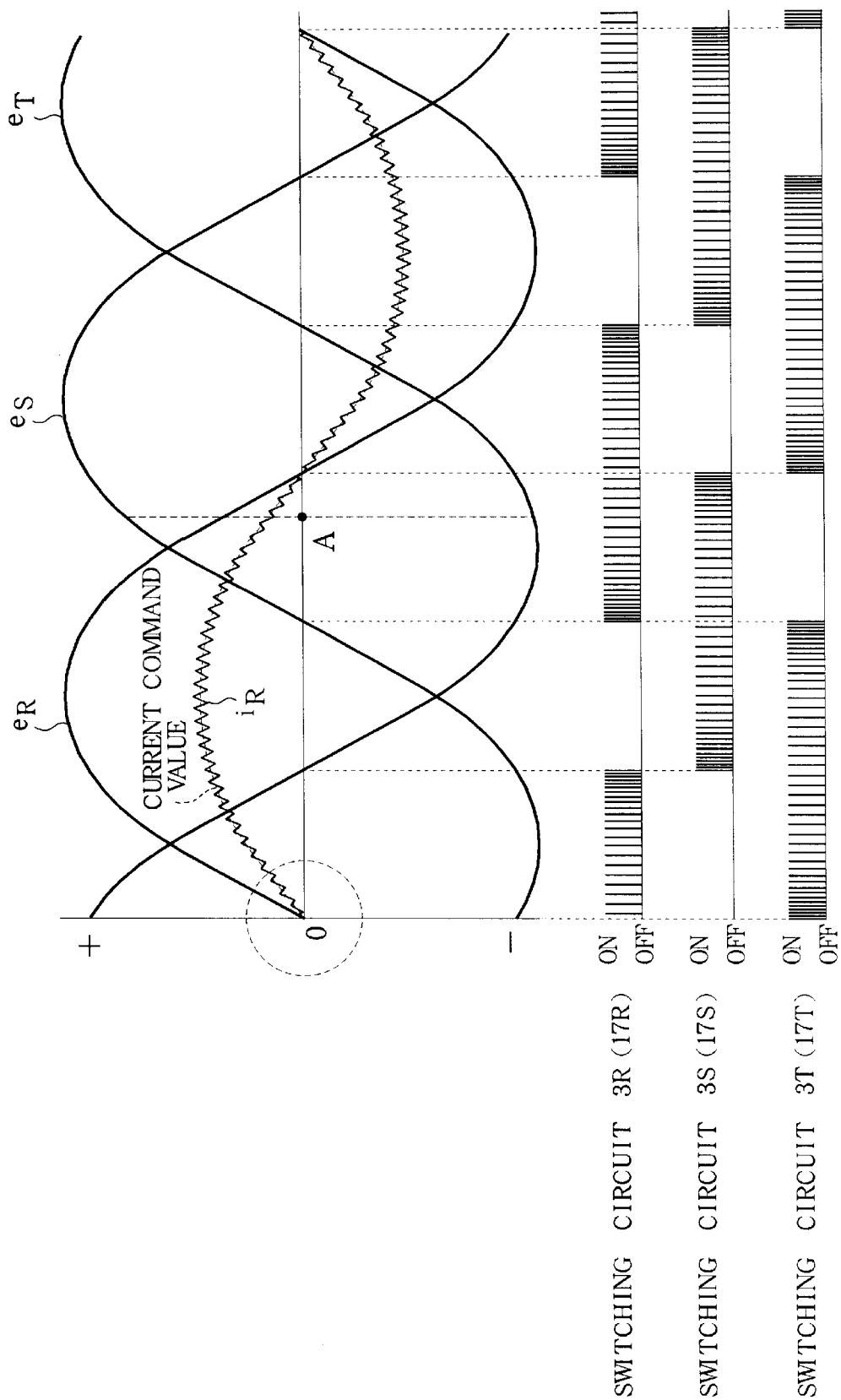
FIG. 3 shows waveforms of phase voltages and phase current of a three-phase AC power supply.
Figure 4:
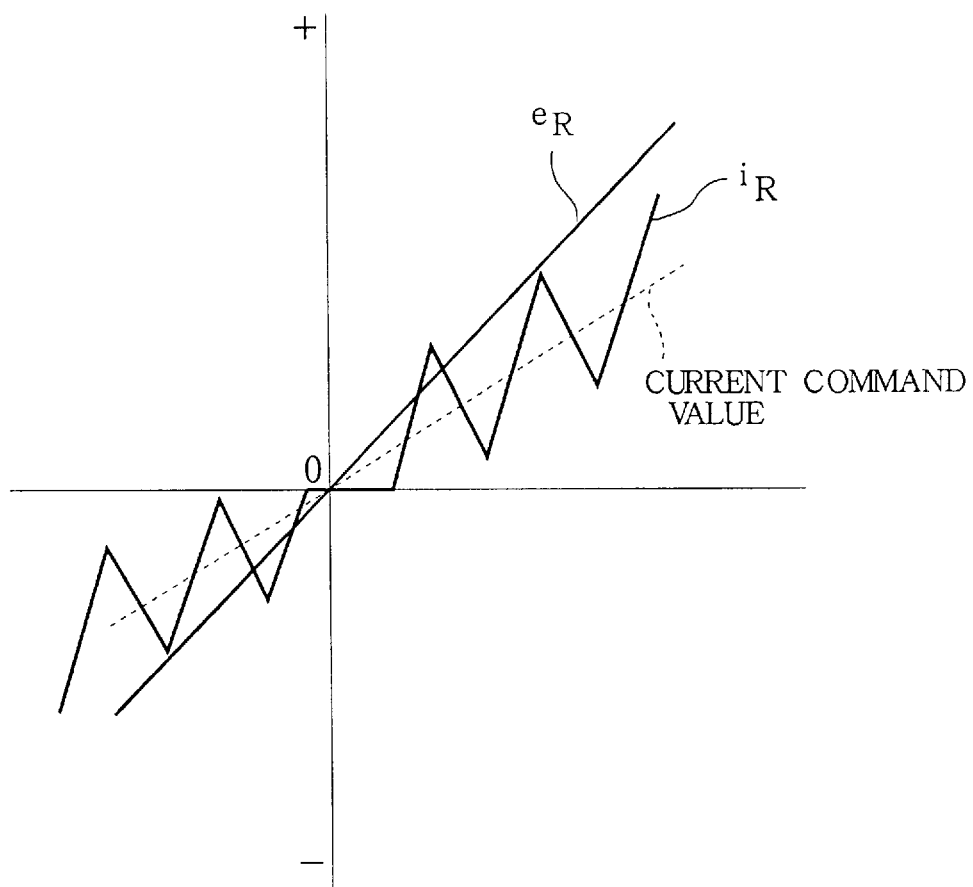
FIG. 4 is a partially enlarged view of the phase voltage and phase current shown in FIG. 3.

The operation of the three-phase bridge rectifier 21 will be described with further reference to FIGS. 3 and 4. The principle of rectification in the embodiment will first be described. Now, consider rectification at time A in FIG. 3. The phase S voltage $e_S$ shows a maximum positive potential at time A and the phase T voltage $e_T$ shows a maximum negative potential at time A. Accordingly, only the positive and negative side diodes 5Ra and 5Tb out of the positive and negative side diodes 5Ra to 5Tb are turned on when FETs 17R–17T of the switching circuits 3R–3T are off at this time, whereupon a phase S current $i_S$ flows to phase T through the output terminal 1S of the three-phase AC power supply 1, the reactor 2S, the diode 15Sa, the positive side diode 5Sa, the positive side DC bus 4a, the smoothing capacitor 6, the negative side DC bus 4b, the negative diode 5Tb, the diode 15Tb, the reactor 2T, and the output terminal 1T in sequence. When the control circuit 11 supplies a gate signal $G_R$ to the switching circuit 3R at time A to turn FET 17R on, a phase R current $i_R$ flows to phase T through the output terminal 1R of the three-phase AC power supply 1, the reactor 2R, the diode 15Ra, FET 17R, the diode 15Rd, the neutral point terminal 7, the capacitor 6b, the negative side DC bus 4b, the negative diode 5Tb, the diode 15Tb, the reactor 2T, and the output terminal 1T to thereby charge the capacitor 6b, since an interphase potential between phases R and T is higher than a terminal voltage of the capacitor 6b while the inverter circuit 8 is driving the motor 9.

Thus, when the control circuit 11 turns FET 17R off during flow of the phase current $i_R$ as described above, electromagnetic energy stored in the reactor 2R flows as the phase current $i_R$ to phase T in sequence through the reactor 2R, the diode 15Ra, the positive side diode 5Ra, the positive side DC bus 4a, the smoothing capacitor 6, the negative side DC bus 4b, the negative side diode 5Tb, the diode 15Tb, the AC side reactor 2T, and the output terminal 1T. Consequently, the phase current $i_R$ can be caused to flow into the intermediate potential phase R. Furthermore, phase S current $i_S$ flowing through the positive side diode 5Sa is slightly insufficient at this time. The switching circuit 3R is also controlled in the same switching manner as described above so that an insufficiency for the phase current $i_S$ is caused to flow into phase T, whereupon the waveform of the phase current $i_T$ can be controlled.

The control circuit 11 makes reference to each of the phase voltages $e_R$, $e_S$ and $e_T$ to detect each zero crossover thereof, so that each zero crossover serves as a reference phase. The control circuit 11 initiates a timing operation at the reference phase to read out data of a current command value (shown by broken line in FIGS. 3 and 4) previously stored in an internal ROM. Simultaneously, the control circuit 11 makes reference to output signals of the current detectors 10S and 10T to thereby control the phase currents $i_S$ and $i_T$ so that they follow up the current command value. The phase current $i_R$ is controlled to follow up the current command value as a consequence of the follow-up control of the phase currents $i_S$ and $i_T$. FIG. 4 is an enlarged view of portions of the phase current $i_R$ and the current command value enclosed in a broken line circle in FIG. 3. In this case, the control circuit 11 makes reference to an output signal of the load current detector 12 to adjust an amplitude level of the current command value in accordance with the load current $i_L$, thereby carrying out the follow-up control so that the load current $i_L$ takes a proper value.

Furthermore, the control circuit 11 controls the switching action of each of the switching circuits 3R, 3S and 3T to perform the current follow-up control, based on the above-described principle. The switching control is performed in a continuous period including a first period of about 60 electrical degrees before the zero crossover and a second period of about 60 electrical degrees after the zero crossover with respect to each of the phase voltages $e_R$, $e_S$ and $e_T$, as shown in FIG. 3. In the switching control, a PWM control is executed in such a manner that the width of a positive pulse indicative of an on period is increased as it comes closer to the zero crossover and that the pulse width is decreased as it goes farther from the zero crossover. As the result of the switching control only in each above-mentioned period, for example, the switching control is executed for each of the switching circuits 3S and 3T but not executed for the switching circuit 3R in each of periods of about 15 degrees respectively before and after a peak of the phase voltage $e_R$ so that the follow-up control is executed for the phase current $i_R$. Thus, the switching control is carried out in the manner as described above so that the waveforms of the phase currents $i_R$, $i_S$ and $i_T$ are rendered approximately sinusoidal in phase with the phase voltages $e_R$, $e_S$ and $e_T$ respectively.

According to the above-described embodiment, the switching circuits 3R, 3S and 3T are provided between the positive side diodes 5Ra, 5Sa and 5Ta and the negative side diodes 5Rb, 5Sb and 5Tb, the positive and negative side diodes having cathodes and anodes connected to the positive and negative side DC buses 4a and 4b, respectively. The control circuit 11 controls the switching action of each of the switching circuits 3R, 3S and 3T in the continuous period including the first period of about 60 degrees before the zero crossover and the second period of about 60 degrees after the zero crossover with respect to each of the phase voltages $e_R$, $e_S$ and $e_T$ of the three-phase AC power supply 1 so that the phase currents $i_R$, $i_S$ and $i_T$ are controlled to follow up the current command value.

Accordingly, the phase currents are caused to also flow through the respective switching circuits 3R–3T into the intermediate potential phase of the three-phase AC power supply voltage although the phase currents cannot be caused to flow into the intermediate potential phase in the conventional three-phase rectifiers. Consequently, since the waveforms of the phase currents $i_R$, $i_S$ and $i_T$ are rendered approximately sinusoidal in phase with the phase voltages $e_R$, $e_S$ and $e_T$ respectively, the harmonic noise can be suppressed and a power supply efficiency can be improved with a power factor of the DC power supply being rendered approximately 1. Furthermore, since an amount of current flowing into the smoothing capacitor 6 is equalized and an amount of ripple current is reduced, the capacity of the smoothing capacitor 6 can be decreased. Additionally, unbalance among the phases can be adjusted by the switching control into a balanced state.

According to the above embodiment, furthermore, since the control circuit 11 determines the amplitude of the current command value in accordance with the load current $i_L$ detected by the load current detector 12, the load current $i_L$ can be controlled to take a suitable value. Furthermore, as the result of use of the switching circuits 3R to 3T, three FETs 17R–17S suffice for the semiconductor switching elements and the reactors 2R–2T need not be rendered large-sized. Consequently, the three-phase bridge rectifier 21 can be rendered small in size and low in cost as compared with a conventional system using a three-phase PWM converter. Additionally, since the switching circuits 3R–3T are not turned on in the periods respectively before and after the peaks of the respective phase voltages $e_R$–$e_T$, each of FETs 17R–17T does not necessitate a high withstand voltage, and therefore, switching loss due to the switching control and switching noise (high-frequency noise) can be suppressed to low levels.

According to the above embodiment, furthermore, the series circuits of the diodes 15Ra and 15Rb, 15Sa and 15Sb, and 15Ta and 15 Tb of the single-phase bridge rectifier circuits 16R, 16S and 16T are interposed between the positive and negative side diodes 5Ra and 5Rb, 5Sa and 5Sb, and 5Ta and 5Tb in the phases R,S and T, respectively. Consequently, since diodes of low withstand voltage can be used for the above-described diodes, the three-phase rectifier of the embodiment is advantageous in the use with a high power supply voltage. Furthermore, the positive and negative side diodes 5Ra–5Tb serve as flywheel diodes even when an inductance component is in the wiring when FETs 17R, 17S and 17T are turned off. Consequently, occurrence of surge voltage can also be restrained. Furthermore, since each of the positive and negative side diodes 5Ra and 5Rb, 5Sa and 5Sb, and 5Ta and 5Tb comprises a high-speed diode, forward and backward recovery losses in these diodes when FETs 17R, 17S and 17T are switched at a high speed can be reduced.

Figure 5:
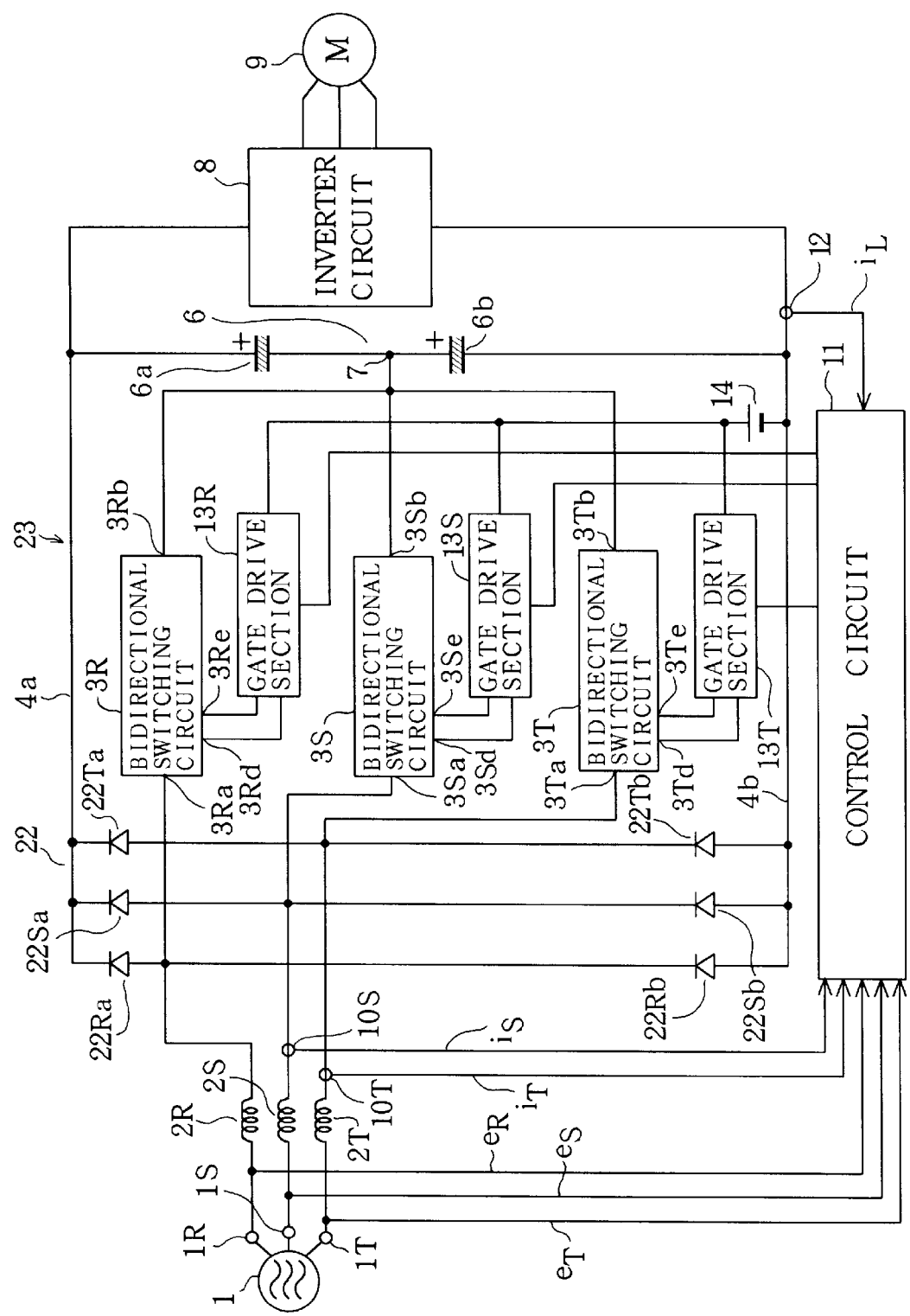
FIG. 5 is a view similar to FIG. 1, showing the three-phase bridge rectifier of a second embodiment in accordance with the present invention.

FIG. 5 illustrates a second embodiment of the present invention. Identical parts are labeled by the same reference symbols in the second embodiment as in the first embodiment. The difference between the first and second embodiments will be described. In FIG. 5 showing an electrical arrangement of a three-phase bridge rectifier, the positive and negative side diodes 5Ra, 5Sa, 5Ta, 5Rb, 5Sb and 5Tb in the first embodiment are eliminated. A three-phase bridge rectifier circuit 22 composed of three-phase bridge connected positive and negative side diodes 22Ra, 22Sa, 22Ta, 22Rb, 22Sb and 22Tb is connected between the positive and negative side DC buses 4a and 4b. The positive and negative side diodes 22Ra–22Tb are high speed diodes. AC input terminals of the three-phase bridge rectifier circuit 22 are connected to the load side terminals of the reactors 2R, 2S and 2T and to the AC input terminals 3Ra, 3Sa and 3Ta of the switching circuits 3R, 3S and 3T, respectively. The other arrangement is the same as that in the first embodiment. The above-described arrangement except the three-phase AC power supply 1, the inverter circuit 8 and the motor 9 constitutes a three-phase bridge rectifier 23. The three-phase bridge rectifier 23 arranged as described above is operated in the same manner as in the first embodiment, whereupon substantially the same effect can be achieved in the second embodiment as in the first embodiment.

Figure 6:
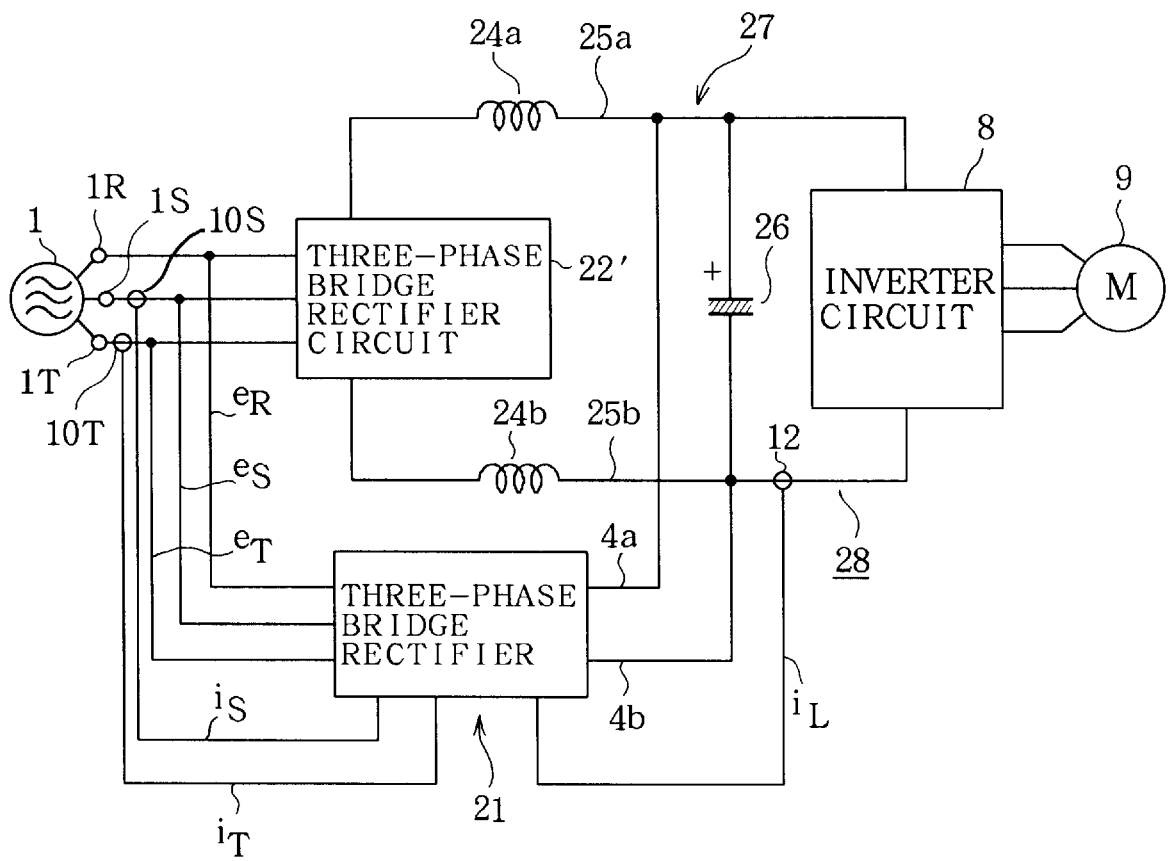
FIG. 6 is a view similar to FIG. 1, showing the three-phase bridge rectifier of a third embodiment in accordance with the present invention.

FIG. 6 illustrates a third embodiment of the present invention. Identical parts are labeled by the same reference symbols in the third embodiment as in the first and second embodiments. The difference between the third embodiment and the first and second embodiments will be described. In FIG. 6 showing an electrical arrangement of a three-phase bridge rectifier, a three-phase bridge rectifier circuit 22' composed of conventional three-phase bridge-connected diodes in the same manner as in the three-phase bridge rectifier circuit 22 in the second embodiment has input terminals connected to the output terminals 1R, 1S and 1T of the three-phase AC power supply 1 and further has positive and negative side DC output terminals connected through the reactors 24a and 24b (DC side reactors) to the positive and negative side DC buses 25a and 25b. The reactors 24a and 24b are connected together to have a common magnetic circuit so that an inductance becomes a large value. Furthermore, the inverter circuit 8 including the motor 9 at its output side and the smoothing capacitor 26 is connected between the positive and negative side DC buses 25a and 25b.

The above-described three-phase bridge rectifier circuit 22', the reactors 24a and 24b, the positive and negative side DC buses 25a and 25b, and the smoothing capacitor 26 constitute another known rectifier circuit 27 of the d.c. reactor insertion type. The positive and negative side DC buses 4a and 4b of the three-phase bridge rectifier 21 as in the first embodiment are connected to the positive and negative side DC buses 25a and 25b so as to be in parallel with the rectifier circuit 27. The above-described arrangement except the three-phase AC power supply 1, the inverter circuit 8 and the motor 9 constitutes a three-phase bridge rectifier 28.

According to the above-described third embodiment, the control circuit 11 of the three-phase rectifier 21 controls the waveforms of currents input to both of the rectifier circuit 27 and the three-phase rectifier 21 so that the waveforms become sinusoidal, making reference to the phase currents $i_S$ and $i_T$. Consequently, the current capacity of the three-phase rectifier 21 can be reduced. Furthermore, since the positive and negative side DC buses 25a and 25b are provided with the reactors 24a and 24b respectively, current ripple can further be restricted.

Figure 7:
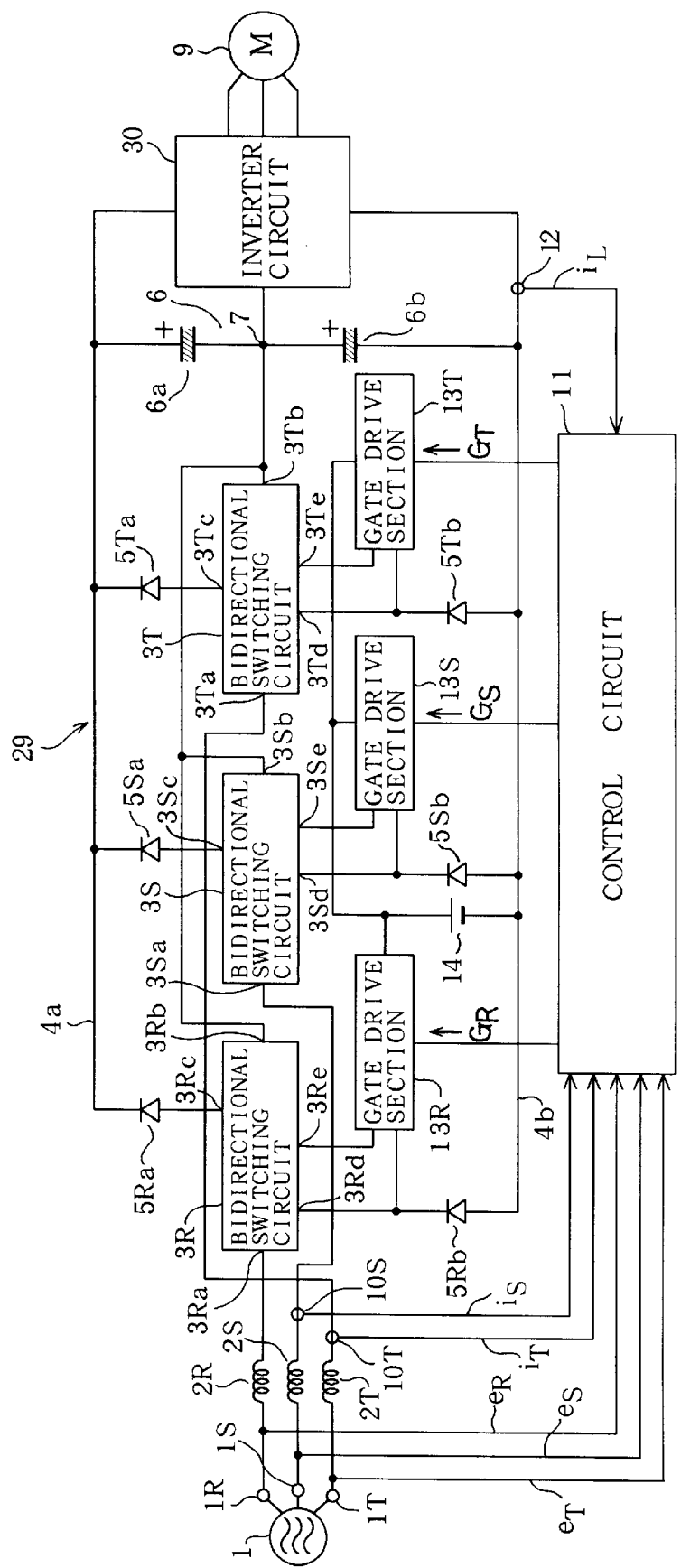
FIG. 7 is a view similar to FIG. 1, showing the three-phase bridge rectifier of a fourth embodiment in accordance with the present invention.

FIG. 7 shows a fourth embodiment of the present invention. Identical parts are labeled by the same reference symbols in the fourth embodiment as in the first embodiment. The difference between the first and fourth embodiments will be described. In FIG. 7 showing an electrical arrangement of a three-phase bridge rectifier 29, an inverter circuit 30 serving as a load is connected between the positive and negative DC buses 4a and 4b, instead of the inverter circuit 8 in the first embodiment. The inverter circuit 30 is composed into a neutral clamp system. The neutral point (not shown) of the inverter circuit 30 is connected to the neutral terminal 7 of the smoothing capacitor 6. The other arrangement is the same as in the first embodiment.

According to the above-described fourth embodiment, when the same control manner as in the first embodiment is executed, the level of the neutral potential of the inverter circuit 30 is added to the current waveform level such that two level waveforms are obtained at each of the positive and negative sides. Consequently, a current waveform approximating the sinusoidal one can be achieved by an easier control manner.

Figure 8:
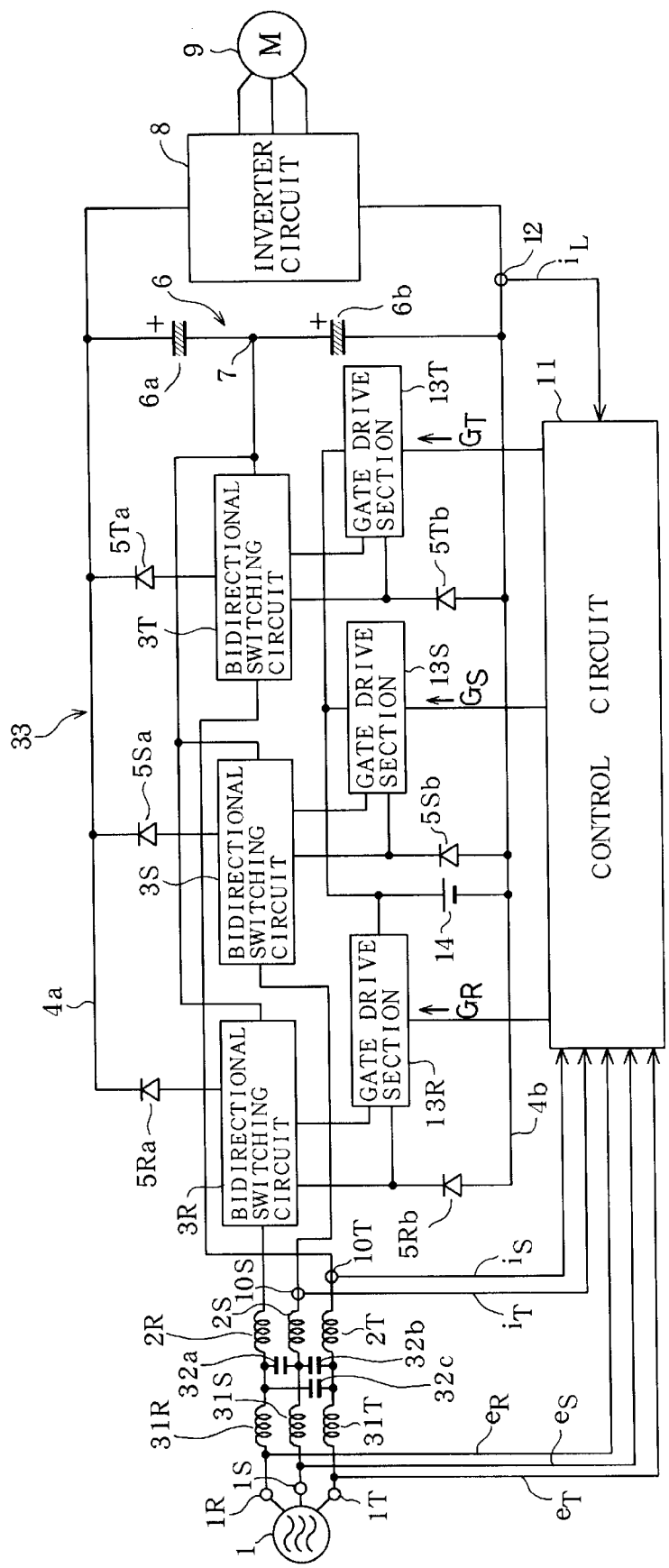
FIG. 8 is a view similar to FIG. 1, showing the three-phase bridge rectifier of a fifth embodiment in accordance with the present invention.

FIG. 8 illustrates a fifth embodiment of the present invention. Identical parts are labeled by the same reference symbols in the fifth embodiment as in the first embodiment. The difference between the first and fifth embodiments will be described. In FIG. 8 showing an electrical arrangement of a three-phase bridge rectifier 33, normal mode reactors 31R, 31S and 31T are interposed between the output terminals 1R, 1S and 1T of the three-phase AC power supply 1 and the reactors 2R, 2S and 2T respectively. Interphase capacitors 32a, 32b and 32c are connected between the phases R and S, the phases S and T, and phases R and T respectively. The other arrangement is the same as in the first embodiment. The above-described arrangement constitutes the three-phase bridge rectifier 33.

According to the above-described fifth embodiment, the normal mode reactors 31R–31T and the action of the interphase capacitors 32a–32c as noise filters can restrict influence of the switching noise due to the switching control of the switching circuits 3R–3T upon the three-phase AC power supply 1 side. Furthermore, since the amplitude of input current to each of FETs 17R–17T is slightly lowered, FETs 17R–17T of the lower capacitor type can be selected, whereupon the three-phase bridge rectifier can be fabricated at lower cost. Furthermore, the accuracy in the detection of phase voltages $e_R$, $e_S$ and $e_T$ by the control circuit 11 can be improved.

The present invention should not be limited to the embodiments described above with reference to the accompanying drawings. The invention may be modified or expanded as follows.

The control circuit 11 controls the switching action of each of the switching circuits 3R, 3S and 3T in the continuous period including the first period of about 60 degrees before the zero crossover and the second period of about 60 degrees after the zero crossover with respect to each of the phase voltages $e_R$, $e_S$ and $e_T$. The continuous period may be varied. For example, the continuous period may include a first period of or above 30 degrees and not more than 60 degrees before the zero crossover and a second period of or above 30 degrees and not more than 60 degrees after the zero crossover with respect to each of the phase voltages $e_R$, $e_S$ and $e_T$. In this case, too, the current waveform can be improved. Furthermore, the switching action control may be performed in the entire period of each of the phase voltages $e_R$, $e_S$ and $e_T$ when semiconductor switching elements of the high withstand voltage type are used. Furthermore, the control manner should not be limited to the above-described switching action control or PWM control. A mere on-off control may be performed for the switching circuits 3R–3T, instead.

The control circuit 11 performs the current follow-up control so that the power factor is rendered approximately one. Alternatively, the control circuit 11 may perform a lagging power factor control so that the phase current lags the phase voltage by a phase angle of, for example, 10 degrees. Current detecting means may be provided for detecting a phase R current. The control circuit 11 may detect interphase voltages instead of the phase voltages $e_R$, $e_S$ and $e_T$ to set reference phases on the basis of zero crossover of the interphase voltages. The current detecting means of the control circuit 11 may detect interphase currents instead of the phase currents $i_R$, $i_S$ and $i_T$.

The control circuit 11 may make reference to the current detectors 10S and 10T, for example, at an initial stage of rectification control to perform the switching action control (PWM control) so that each of the phase currents $i_R$, $i_S$ and $i_T$ or each interphase current takes a predetermined value. Consequently, the control circuit 11 may set, for the reference phase for the current command value, a point of time when a ratio of on time to off time in the switching action control becomes maximum, when an on time becomes maximum, when an off time becomes minimum, or when an estimated phase current value becomes approximately zero. In this case, the control circuit 11 need not detect the phase voltages $e_R$, $e_S$ and $e_T$. Furthermore, the control circuit 11 may control current waveforms in accordance with a predetermined current pattern, instead of the current follow-up control.

Terminal voltage detecting means may be provided for detecting terminal voltages of the capacitors 6a and 6b respectively. The control circuit 11 may perform the switching control so that the terminal voltages of the capacitors 6a and 6b takes preset values respectively or preferably, equal preset values. For example, the switching action control may be carried out so that an average value of currents flowing into the neutral terminal 7 in one period of the three-phase AC power supply 1 becomes zero. Such a control manner can render the withstand voltage of each of the capacitors 6a and 6b one half in the case where a single smoothing capacitor is provided. Furthermore, no resistance for adjusting potential balance is required, whereupon the efficiency of the three-phase rectifier can be improved and the three-phase rectifier can be rendered smaller in size. Additionally, in case that a control power supply for the control circuit 11 is composed of a chopper or a switching power supply circuit, the control power supply can take a lower receiving voltage when power is received from the capacitor 6b.

In the above-described third embodiment, the reactors 24a and 24b may or may not be provided. Furthermore, either one of the reactors may be provided. Furthermore, the three-phase rectifier 23 of the second embodiment may be connected in parallel with the rectifier circuit 27, instead of the three-phase rectifier 21. Additionally, the smoothing capacitor 26 may be eliminated.

In the above-described fifth embodiment, either normal mode reactors 31R–31T or interphase capacitors 32a–32c may be provided. Common mode reactors (zero phase reactors) may be provided instead of the normal mode reactors 31R–31T. In this case, harmonic noise or leakage current can more effectively be restrained by the switching control.

Either or both of the normal mode reactors 31R–31T and the interphase capacitors 32a–32c may be provided in the three-phase rectifier 23 of the second embodiment or the three-phase rectifier 27 of the third embodiment.

Furthermore, in the fifth embodiment, the reactors 2R–2T and the interphase capacitors 32a–32c may be set at respective small values so that the current waveforms accompany slight resonance. Switching noise can further be reduced when the control circuit 11 turns the switching circuits 3R–3T off when the resonance lowers the current waveform amplitude.

The semiconductor switching elements should not be limited to FETs 17R–17T. Transistors may be used therefor. Furthermore, the load should not be limited to the inverter circuits 8 and 30. Any load driven by a DC power supply may be employed.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

I claim:

1. A three-phase bridge rectifier comprising:

three bidirectional switching circuits each including a single-phase rectifier circuit having four single-phase bridge-connected diodes and a semiconductor switching element connected between DC output terminals of the single-phase rectifier circuit;

three AC side reactors each connected between one of two AC input terminals of each bidirectional switching circuit and each one of output terminals of a three-phase AC power supply;

three positive side diodes each having an anode connected to a positive side DC output terminal of each one of the bidirectional switching circuits and a cathode connected to a positive side DC bus;

three negative side diodes each having a cathode connected to a negative side DC output terminal of each one of the bidirectional switching circuits and an anode connected to a negative side DC bus;

a smoothing capacitor including two capacitors series connected between the positive and negative side DC buses and a neutral terminal connected to the other AC input terminal of each bidirectional switching circuit; and a control circuit for controlling the semiconductor switching elements of the respective bidirectional switching circuits.

2. A three-phase bridge rectifier according to claim 1, further comprising another three-phase rectifier circuit including six three-phase bridge-connected diodes, AC input terminals connected to the output terminals of the three-phase AC power supply respectively, positive and negative side DC output terminals connected to the positive and negative side DC buses respectively, a DC side reactor or reactors connected across either one or both of the positive and negative side DC buses.

3. A three-phase bridge rectifier according to claim 1, wherein the control circuit controls a switching action of each switching element in a period of or above about 30 degrees and below 60 degrees before the zero crossover and a period of or above about 30 degrees and below 60 degrees after the zero crossover with respect to each of the phase voltages of the three-phase AC power supply, both periods being continuous.

4. A three-phase bridge rectifier according to claim 1, further comprising terminal voltage detecting means for detecting terminal voltages of the two capacitors of the smoothing capacitor, and wherein the control circuit is adapted to control the switching action of each switching element so that the terminal voltages of the capacitors become respective set values unequal or approximately equal to each other.

5. A three-phase bridge rectifier according claim 1, further comprising three interphase capacitors connected between output terminals of the three-phase AC power supply and three normal mode reactors or common mode reactors interposed between each output terminal of the three-phase AC power supply and three AC side reactors respectively.

6. A three-phase bridge rectifier according to claim 1, further comprising current detecting means for detecting phase currents of at least optional two phases of the three-phase AC power supply, and wherein the control circuit controls the switching action of each semiconductor switching element so that each phase current detected by the current detecting means follows up a current command value.

7. A three-phase bridge rectifier according to claim 6, wherein the control circuit is adapted to set a or the zero crossover of either one of each phase voltage or each interphase voltage for a reference phase of the current command value.

8. A three-phase bridge rectifier according to claim 6, wherein the control circuit controls the switching action of each switching element so that each phase current becomes a predetermined value and the control circuit is adapted to set, for a reference phase of the current command value, the time when a ratio of on time to off time is rendered maximum, when the on time is rendered maximum, when the off time is rendered minimum, or when an estimated phase voltage value is rendered approximately zero.

9. A three-phase bridge rectifier according to claim 6, further comprising load current detecting means for detecting a load current flowing into a load connected between the positive and negative side DC buses, and wherein the control circuit is adapted to determine an amplitude of the current command value on the basis of the load current detected by the load current detecting means.

10. A three-phase bridge rectifier comprising:

three bidirectional switching circuits each including a single-phase rectifier circuit having four single-phase bridge-connected diodes and a semiconductor switching element connected between DC output terminals of the single-phase rectifier circuit;

three AC side reactors each connected between one of two AC input terminals of each bidirectional switching circuit and each one of output terminals of a three-phase AC power supply;

three positive side diodes each comprising a high-speed diode and having an anode connected to said one AC input terminal of each one of the bidirectional switching circuits and a cathode connected to a positive side DC bus;

three negative side diodes each comprising a high-speed diode and having a cathode connected to said one AC input terminal of each one of the bidirectional switching circuits and an anode connected to a negative side DC bus;

a smoothing capacitor including two capacitors series connected between the positive and negative side DC buses and a neutral terminal connected to the other AC input terminal of each bidirectional switching circuit; and a control circuit for controlling the semiconductor switching elements of the respective bidirectional switching circuits so that the semiconductor switching elements are switched at a high speed.

11. A three-phase bridge rectifier according to claim 10, wherein the control circuit controls a switching action of each switching element in a period of or above about 30 degrees and below 60 degrees before the zero crossover and a period of or above about 30 degrees and below 60 degrees after the zero crossover with respect to each of the phase voltages of the three-phase AC power supply, both periods being continuous.

12. A three-phase bridge rectifier according to claim 10, further comprising terminal voltage detecting means for detecting terminal voltages of the two capacitors of the smoothing capacitor, and wherein the control circuit is adapted to control the switching action of each switching element so that the terminal voltages of the capacitors become respective set values unequal or approximately equal to each other.

13. A three-phase bridge rectifier according claim 10, further comprising three interphase capacitors connected between output terminals of the three-phase AC power supply and three normal mode reactors or common mode reactors interposed between each output terminal of the three-phase AC power supply and three AC side reactors respectively.

14. A three-phase bridge rectifier according to claim 10, further comprising current detecting means for detecting phase currents of at least optional two phases of the three-phase AC power supply, and wherein the control circuit controls the switching action of each semiconductor switching element so that each phase current detected by the current detecting means follows up a current command value.

15. A three-phase bridge rectifier according to claim 14, wherein the control circuit is adapted to set a or the zero crossover of either one of each phase voltage or each interphase voltage for a reference phase of the current command value.

16. A three-phase bridge rectifier according to claim 14, wherein the control circuit controls the switching action of each switching element so that each phase current becomes a predetermined value and the control circuit is adapted to set, for a reference phase of the current command value, the time when a ratio of on time to off time is rendered maximum, when the on time is rendered maximum, when the off time is rendered minimum, or when an estimated phase voltage value is rendered approximately zero.

17. A three-phase bridge rectifier according to claim 14, further comprising load current detecting means for detecting a load current flowing into a load connected between the positive and negative side DC buses, and wherein the control circuit is adapted to determine an amplitude of the current command value on the basis of the load current detected by the load current detecting means.

* * * * *